Nov. 3, 1942.    G. M. BROWN    2,301,106
PACKAGING
Filed March 9, 1940    2 Sheets-Sheet 1
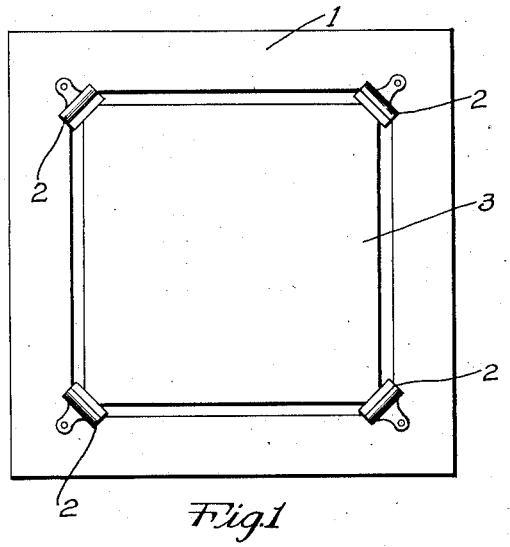
Fig. 1
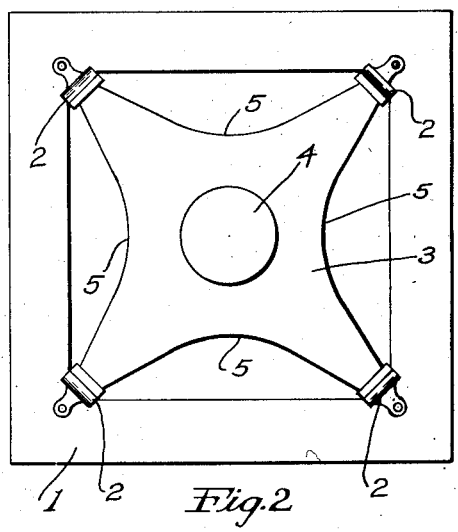
Fig. 2
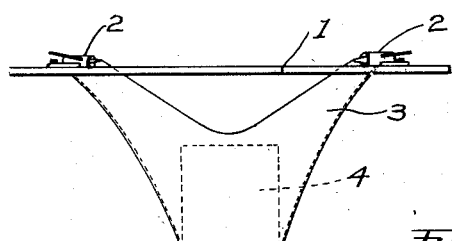
Fig. 3    Fig. 4
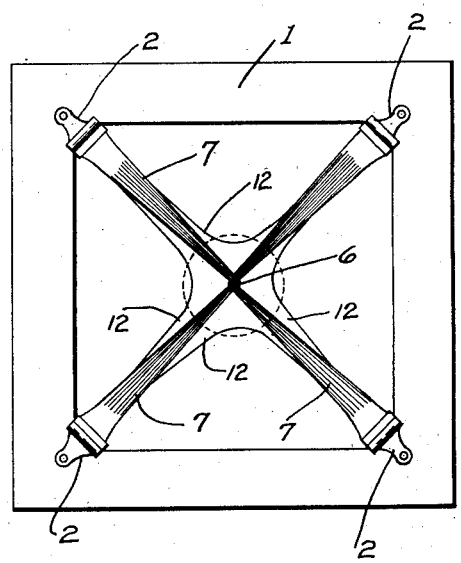
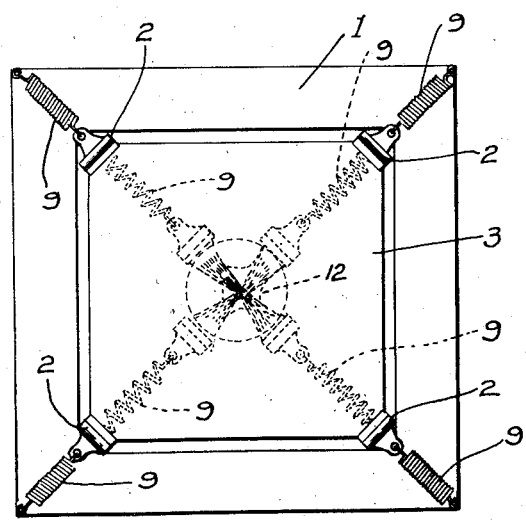
Fig. 5
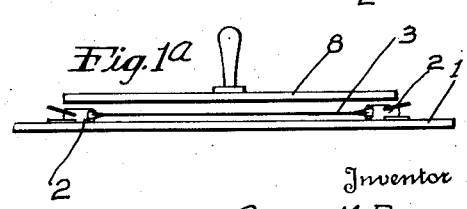
Fig. 1a
Inventor
George M. Brown
Attorney Nov. 3, 1942.　　　G. M. BROWN　　　2,301,106
PACKAGING
Filed March 9, 1940　　　2 Sheets-Sheet 2

Inventor
George M. Brown

Attorney

Patented Nov. 3, 1942

2,301,106

UNITED STATES PATENT OFFICE 2,301,106

PACKAGING

George M. Brown, Cuyahoga Falls, Ohio, assignor to Wingfoot Corporation, Wilmington, Del., a corporation of Delaware Application March 9, 1940, Serial No. 323,172

4 Claims. (Cl. 18—56)

This invention relates to the packaging of articles in a thermo-stretchable film, i. e., a film which when heated can be stretched. A preferred film for this use is a film of rubber hydrochloride, and the invention will be described more particularly as applied to the use of this film. A colorless transparent film is preferred although a film of rubber hydrochloride which has been dyed or pigmented may be used. The object to be wrapped may be of a regular or irregular shape.

One method of wrapping objects in rubber hydrochloride film which has been previously suggested comprises heating the film and then while it is hot, but not so hot as to be tacky, the object to be wrapped is pushed into the film while the whole of the perimeter is held by clamps. When the film has been stretched by the pushing operation so that the sides of the object are covered with the film, the object is twisted so as to complete the wrapping of the object. The entire object is thus enclosed in rubber hydrochloride film.

This general procedure has been found satisfactory for certain packaging operations but for packaging other articles, it has not been entirely satisfactory. For example it has been found that wrappings thus formed around a bottle are too fragile to have any commercial value. This is due to the fact that stretching makes the film thinner and imparts a grain to it. The thin film is quite easily ruptured along its grain.

According to the present invention, the film is heated and stretched over the object to be wrapped but instead of clamping the film along its entire perimeter during the stretching and wrapping operation, the film is held at only a few points, and according to a preferred method of operation these points are adapted to move toward the object being wrapped during the wrapping operation. The invention and the differences between the invention and the prior art just discussed will be evident from a study of the drawings in which the invention is illustrated. It is to be understood that the drawings are illustrative only, and the invention is not limited to the particular devices there shown.

Figure 6:
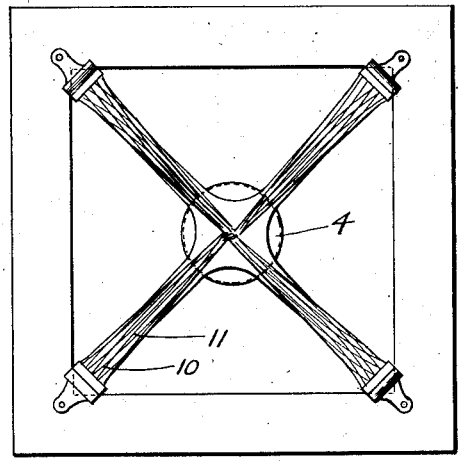
Figure 8:
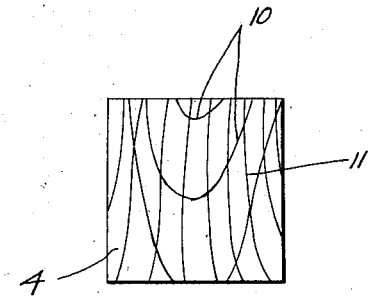
Figure 7:
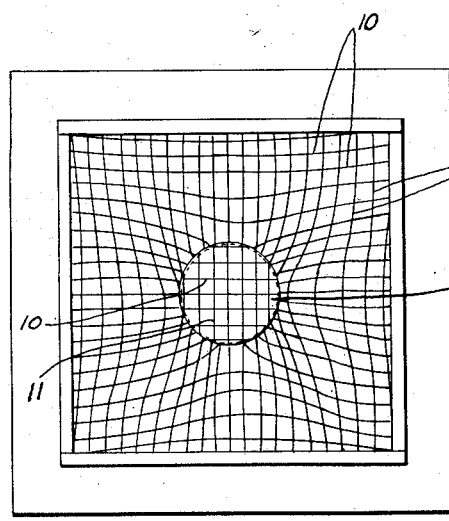
Figure 9:
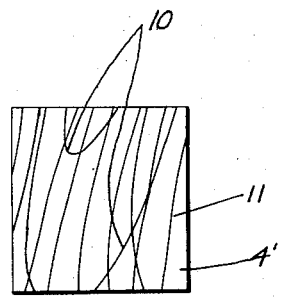

In the drawings, Fig. 1 is a top view of apparatus adapted for carrying out the invention with the film held in place. Fig. 1a is a section through Fig. 1, but with a heater which is not shown in Fig. 1. Fig. 2 is a top view of Fig. 1, but with the article to be wrapped in place and the wrapping partly completed. Fig. 3 is a side view of Fig. 2. Fig. 4 is a top view of the article completely wrapped but before the film has been released from the clamps which hold it. Fig. 5 is a modification of the apparatus shown in Fig. 1. Fig. 6 is a top view of a similar article wrapped by the method of Figs. 1-4 with a a graphic showing of the manner in which the film is stretched. Fig. 7 is a similar view of an article wrapped by the method of the prior art. Fig. 8 is a side view of the wrapped article shown in Fig. 6, and Fig. 9 is a side view of the wrapped article as shown in Fig. 7.

Fig. 1 shows a simplified apparatus for carrying out the invention. The frame 1 which may be circular or rectangular or of any desired shape is shown as a square frame. At the four corners are clamps 2: the clamps shown are of the type commonly used for clamping papers together in which the jaws are held together by a slit cylinder or spring steel. The film 3 is held in these clamps. The frame may, for example, be of sufficient size to provide an opening twelve inches square. The clamps may be three inches across the bite. The frame is preferably of metal but may be made of other material.

In a preferred arrangement, the clamps are provided so that they can all be opened and closed simultaneously. This may be effected by movement of a pedal connected with the clamps by any convenient operating means. The film may be supplied to the frame from a roll of film of the width required for any particular packaging operation. The film may be fed from the roll to the clamps by hand or by mechanical means. For example, an operator opening the clamp with a foot pedal may draw film from the roll between the clamps and then by removing his foot from the pedal allow the clamps to spring back and grasp the film. The film may be cut to size before being grasped by the clamps. This entire operation may advantageously be carried out by automatic means.

The film is preferably heated after it is clamped in place. This may be done by lowering a hot plate to a position adjacent to or in direct contact with the film so that heat radiating from the hot plate heats the film. Fig. 1a shows the hot plate 8 brought close to the film to heat it. The hot plate may be heated electrically, if desired. Although the drawing shows the hot plate provided with a handle for manual operation, it may be operated mechanically, and automatically. By directing the heat toward a certain portion of the film, such as the outer portions, the film may be made more readily stretchable in these portions than in the inner portion of the sheet. The film should be heated to a temperature at which it becomes easily stretchable. The hot plate may be so shaped that only a minimum amount of heat is imparted to the film in the areas where the film is held by the clamps.

After heating, the object to be wrapped is pressed into the film so that the whole of the object to be wrapped passes through the plane which the film occupies. The object is preferably moved a considerable distance after it passes through this plane so that the film is stretched to a considerable extent. An object of any desired shape may be so wrapped. It may be a toy or a can or a box or a ham or an apple or any fruit or other edible or any desired article. The size of film required will of course depend upon the size of the article to be wrapped. It will also depend upon the amount that the film is stretched during the wrapping operation. The illustration shows a can about 2¾ inches high and 2¾ inches in diameter being wrapped by a sheet of film ten inches square. In a sheet of this size, a larger or smaller can can be wrapped. Although the can of the illustrations is regular in shape, there are particular advantages in wrapping an object of irregular shape. For example, a cut of meat several inches long and several inches through when wrapped by this process has a very pleasing appearance, because the film is stretched so that it conforms to the shape of the body of the meat, and the only place where a seam is found is at the end of the meat where the film is twisted in completing the inclosure.

In wrapping the can or other object it is pushed against the heated film from above or below or from the side. Fig. 2 is a top view showing the apparatus and film of Fig. 1, but with the can 4 pressed down into the film to such an extent that the film may be gathered together over the top of the can to seal it in the film. The strain of stretching has pulled the sides of the film 5 away from the frame I as shown in the drawings.

After the can has been pushed into the film a sufficient distance so that on twisting, the film will be twisted at the top of the can and will completely cover the can, then the can is twisted so as to complete the wrapping. A twist of half a rotation or a full rotation or more will suffice. The surplus film held by the clamps may then be cut off or it may be pressed to the film which covers the top of the can. Fig. 4 shows the twist 6 at the top of the can. Instead of twisting the film to complete the inclosure of the object in the film, the inclosure may be sealed in any suitable manner. The film is sufficiently warm so that on twisting, the contacting surfaces coalesce to form a substantially air tight seal.

As seen from Fig. 4, there is considerable waste due to the areas 7 of film extending from the clamps 2 to the twist 6. To reduce this waste to a minimum and also to increase the amount of film used as a wrapper for the can, the clamps 2 instead of being held rigidly may be held by springs or, for example, by rods which allow the clamps 2 to travel towards the center of the frame during the wrapping and before or during the twisting operation. Fig. 5 shows apparatus similar to that shown in Fig. 1, but with the clamps supported by springs 9 which yield as the film is stretched, as indicated in dotted lines. Any suitable resilient support may be employed.

To study just what takes place during the stretching operation, and to compare the operation and its results with the prior art stretching method described at the first of this patent specification, two identical cans were wrapped in films of the same gauge and size, subjecting the film to the same heating and holding the film in the same sized frame. To study the amount of stretch and the amount to which different areas of the film were stretched, the two films were cross-ruled with lines one-half inch apart before wrapping the cans in them. Figs. 6 and 8 illustrate the can wrapped by the present method and Figs. 7 and 9 illustrate the can wrapped by the prior art method. For the sake of clarity the ruled lines parallel to the bottom of the drawings are numbered 10, and those perpendicular are numbered 11.

Let us first consider the effect of the prior art method of stretching as illustrated in Figs. 7 and 9. This shows that when the film is held firmly throughout its entire perimeter, during the stretching operation, the area of film which is stretched is quite limited. This is easily explained. As the film is stretched, it becomes thinner and as it becomes thinner, it is more easily stretched, thus the area of film which is stretched is quite limited. Of course this general rule holds only until the film has been stretched to a sufficient extent to materially increase its tensile strength. It is seen from a consideration of Fig. 7, that as the can is pushed through the film it is only that portion of the film near the center of the sheet which is stretched in covering the can, although the film covering the bottom of the can is not stretched at all. The film at the sides has been stretched some 500 to 700 per cent. This is evident from the distance between the lines on the film which covers the sides of the can. For instance, in Fig. 9, the distance between the lines 10 is about three inches. Before stretching, the distance between these lines was only one-half inch. The film between these lines has therefore been stretched about 600 per cent. The lines 11 which are more or less perpendicular are still about one-half inch apart. This shows that the film has not been stretched circumferentially around the can, and this is readily understandable. The lines 11 are not exactly perpendicular, because they were twisted somewhat when the twist was formed.

Figs. 6 and 8 show that the film covering the can 4 in these figures has not been stretched to the same extent as the film covering the can 4' in Figs. 7 and 9. As the can is pushed into the film, as shown in Fig. 2, the sides of the film are drawn toward the can and substantially the whole of the sheet (except that covering the bottom of the can) is stretched. This is shown by the distortion of the lines 10 and 11 in Fig. 6. This is entirely different from the stretching which takes place where the entire perimeter is held in place, as in the prior art method shown in Figs. 7 and 9 where the film is stretched only near its center. Using rubber hydrochloride film about .001 of an inch thick, heating it to a temperature at which it becomes easily stretchable and supporting the film only at its four corners, the strain asserted by pushing an object into the film is sufficient to draw the edges of the film towards the object. When the edges of the film are held in place as in Figs. 7 and 9, the area of film which is stretched is confined to a portion near the center of the film. In the improved method of this invention illustrated in Figs. 6 and 8, the edges of the film are drawn toward the can, and the amount which the film is stretched in covering the can is materially reduced. This is shown from the distance between the lines 10 in Fig. 8. Whereas the distance between these lines 10 in Fig. 9 was about three inches, it is not over an inch or an inch and one-half in Fig. 8. This shows that whereas according to the prior art method illustrated in Fig. 9, the film was stretched from 500 to 700 per cent over the sides of the can; in the present method, it is stretched only 200 or 300 per cent. As shown in Fig. 7, there is a large amount of waste according to the prior art method. As shown in Fig. 8, there is much less waste according to the improved method of the present invention. The portion of film left in the frame shown in Fig. 6 has been stretched as shown by the lines 10 and 11 which the draftsman has illustrated as clearly as possible. The areas of film extending from the clamps to the twist at the top of the can are wrinkled, and therefore it has been difficult to adequately show the amount of stretch in these portions of the film as is evidenced by the distance between the ruled lines. However, it is clear from a direct observation of the results that this film has been stretched whereas the main portion of the film shown in Fig. 7 has not been stretched.

The package formed by the improved method of the present invention can be distinguished from that of the prior art method herein described by examining the closure. Inclosing the package by the prior art method, a rosette is formed when the film is twisted. Inclosing by the present invention, the closure is formed by a lapping over of the portions of film extending from the clamps to the object being wrapped. Another characteristic of the type of closure formed by the present invention is a web 12 (Figs. 4 and 5) formed by the unsupported edges of the film. When the twist is made this web may be trimmed although such is not necessary.

After the twist is formed the portions of film 7 which extend from the twist to the clamp are cut. The stubs thus formed may be pressed to the film covering the top of the can, while still hot, to cause them to adhere to the film covering the object. In this way the twist is made permanent, and prevented from untwisting.

Although the invention has been described in particular as applied to the wrapping of an object in rubber hydrochloride film, other thermo-stretchable film may be employed such as a chlorinated rubber hydrochloride or a thermo-stretchable film of cellulosic or other material. If a rubber hydrochloride film is employed, it will advantageously be a sheet about .001 of an inch thick. It may, for example, be .0005 inch thick up to .0015 or .002 inch thick. It may be necessary to heat the thicker film to a somewhat higher temperature than it is necessary to heat the thinner film in order to obtain the desired amount of stretch.

Although in the drawings a square sheet is shown supported at the four corners, the invention is not limited to this specific example. A circular film supported at three or more places may be employed. Or the film may be triangular and may be supported at the three points. If a large square of film is used, it is conceivable that it may be supported not only at the corners but also at the sides. The invention applies to an operation in which the thermo-stretchable film is supported at any small number of points as distinguished from the prior art application in which the whole circumference of the film or substantially the whole circumference of the film is held in a clamp and is prevented from being drawn to the can or other article being wrapped.

I claim:

1. The method of inclosing an object in a thermo-stretchable film which comprises heating the film and while grasping the film at a small number of points around its perimeter, pressing the object to be wrapped against the film, thereby stretching the film and partially inclosing the object, while thus causing the sides of the film between the points of support to be drawn toward the object, and then twisting the object with respect to the points supporting the film thereby completing the inclosure of the object in the film.

2. In the process of inclosing an object in a thermo-stretchable film, which film is held at its perimeter by several widely separated points, the step which comprises moving the object and the heated film with respect to one another so that the object passes through the plane occupied by the unstretched film, thus stretching the film around the object and in so stretching the film drawing toward the object the edges of the film which are between the supporting points.

3. The method of inclosing an object in a thermo-stretchable film which comprises supporting the film in a relatively taut condition by a plurality of supports arranged in substantially the same plane, such supports being movable toward said object as it is being wrapped, heating the film thus supported to make it stretchable and then by moving the object with respect to the film, causing the film to stretch over the surface of the object as the supports move toward the object, and finally twisting the object with respect to the supports so as to completely inclose the object in the film.

4. The method of inclosing an object in a substantially square film of rubber hydrochloride which comprises supporting the film at its corners, heating the film to render it stretchable, pressing the object against the heated film with sufficient force to draw the sides of the film toward the object, thereby partially inclosing the object in the film, then twisting the object with respect to the film supports and then pressing to the film which covers the object at least a part of each of the four portions of the film which after twisting extend to the film supports, thereby preventing the twist from untwisting.

GEORGE M. BROWN.